United States Patent [19]

Ando

[11] 4,025,789

[45] May 24, 1977

[54] IMAGE FORMATION METHOD

[75] Inventor: Yujiro Ando, Yokohama, Japan

[73] Assignee: Canon Kabushiki Kaisha, Tokyo, Japan

[22] Filed: May 28, 1976

[21] Appl. No.: 690,924

[30] Foreign Application Priority Data

Nov. 14, 1973 Japan .............................. 48-1280

Related U.S. Application Data

[63] Continuation of Ser. No. 522,456, Nov. 8, 1974, Pat. No. 3,961,192.

[52] U.S. Cl. ........................ 250/315 R; 250/315 A
[51] Int. Cl.[2] ........................................ G03B 41/16
[58] Field of Search .................... 250/315 A, 315 R

[56] References Cited

UNITED STATES PATENTS

| | | | |
|---|---|---|---|
| 3,774,029 | 11/1973 | Muntz | 250/315 A |
| 3,828,192 | 8/1974 | Morsell | 250/315 A |
| 3,859,529 | 1/1975 | Prouchian | 250/315 A |

*Primary Examiner*—Craig E. Church

[57] ABSTRACT

In an image formation method comprising introducing gases into a gap portion defined by and between two anode and cathode electrodes, and irradiating the gases with a radiation to thereby form an electrostatic latent image on a recording medium disposed in the gap portion, at least one of the electrodes is intended to provide concentric circular potential variations to cause an electric field acting between the electrodes to be varied along the direction of application of the radiation.

5 Claims, 15 Drawing Figures

IMAGE FORMATION METHOD

This is a continuation of application Ser. No. 522,456, filed Nov. 8, 1974 now U.S. Pat. No. 3,961,192.

BACKGROUND OF THE INVENTION

1. Field of the Invention

This invention relates to a method of forming an image by the use of a radiation, and more particularly to an image formation method utilizing the electroradiography which effects image formation by using gases ionizable by an ionization such as X-rays, ultraviolet rays, gamma rays or the like.

2. Description of the Prior Art

Image formation methods which use X-rays to ionize gases and effect the image formation have heretofore been disclosed in published German Pat. No. 1,497,093 specification (hereinafter referred to as DAS 1,497,093) and open German Pat. No. 2,258,364 specification (hereinafter referred to as DOS 2,258,364). For example, according to the technique disclosed in DOS 2,258,364, a film of insulative material for retaining a latent image thereon is inserted in a gas chamber provided by a gap portion defined by and between two electrodes. As the ionizable gases, gases of substances of atomic number 36 and up such as xenon and others are introduced at a high pressure to fill the gas chamber. These gases, when irradiated with X-rays, are ionized to produce electrons and positive ions, but in order to increase the absorption of the X-rays and provide a good sensitivity, the gases must be maintained at several tens of atmospheric pressure if the thickness of the gap portion is of the order of 2mm. Those electrons and positive ions produced from the gases upon their exposure to the X-rays through a body are attracted to the electrode portion by the action of the field resulting from the electrodes, whereby an electrostatic latent image is formed on the film. The technique disclosed in DAS 1,497,093 is approximate in principle to that described above, but the pressure of the gases used therein is close to the atmospheric pressure.

In the technique disclosed in DOS 2,258,364, gases at several tens of atmospheric pressures should preferably be used if the gap portion forming the gas chamber is of the order of 2mm, and this necessitates a high degree of skill in the choice of the gas chamber construction and the material therefor as well as in the handling of the high pressure gases. A solution to this problem would be to reduce the gas pressure in the gas chamber, which in turn would lead to the necessity of increasing the thickness of the gas portion forming the gas chamber. However, an increased thickness of the gap portion would reduce the image resolving power of the electrostatic latent image in the marginal region thereof. Such phenomenon of reduced resolving power will be described by reference to FIG. 1 of the accompanying drawings. FIG. 1(*a*) schematically depicts an electroradiography apparatus, in which a source of X-rays is designated by numeral 1 and high pressure gases such as xenon, krypton, radon, etc. are present in a gap portion 4 defined by and between electrodes 2 and 3. In the apparatus of FIG. 1(*a*), it is assumed that the distance from the X-ray source 1 to the electrode adjacent the X-ray source is 1.5 m and that the thickness of the gap portion 4 is 10mm instead of 2mm, because the gas pressure therein is selected to the order of five atmospheric pressures, instead of several tens of atmospheric pressures which should originally be the gas pressure level. In such case, when X-rays carrying a spot image is applied between the two electrodes, the high pressure gases will be ionized by the X-rays to produce charges and these charges will be attracted to an insulative film 5 (see FIG. 1(*b*)) disposed on the electrode 2, whereby an electrostatic latent image will be formed on the film. This completed electrostatic latent image, when seen, will be such that a region thereof which should form a spot image, which has existed on a diameter of 350mm, appears as a line of 1.17mm. More specifically, where the electrodes are planar and the gap portion defined by the electrodes is thick and if the X-rays are emitted from a single spot, there will occur a problem that the electrostatic latent image formed on the insulative film has a resolving power progressively reduced from the center region toward the marginal region.

SUMMARY OF THE INVENTION

It is a primary object of the present invention to provide a radiography method which provides a high resolving power.

It is another object of the present invention to provide an image formation method whereby the thickness of a gap portion between electrodes forming a gas chamber may be increased to thereby enable an image of high resolving power to be formed even if the gases retained in the gas chamber is used at a lower pressure level than has been conventional.

Other objects and advantages of the present invention will become fully apparent from the following detailed description taken in conjunction with the accompanying drawings.

The present invention provides a method of forming an electrostatic latent image on an insulative sheet member capable of retaining charge thereon, which method comprises filling a gap portion between two anode and cathode electrodes with pressurized gases of substances of higher atomic numbers, and ionizing the gases by application of a radiation thereto to thereby form an electrostatic latent image on the sheet member, wherein the voltage applied to at least one of the electrodes is varied in a planar manner to cause an electric field acting between the electrodes to be bent along the direction of application of the radiation.

BRIEF DESCRIPTION OF THE DRAWINGS

FIG. 1(*b*) is an enlarged view showing the end portion of the electrode portion of the apparatus shown in FIG. 1(*a*).

DESCRIPTION OF THE PREFERRED EMBODIMENTS

Figure 1A:
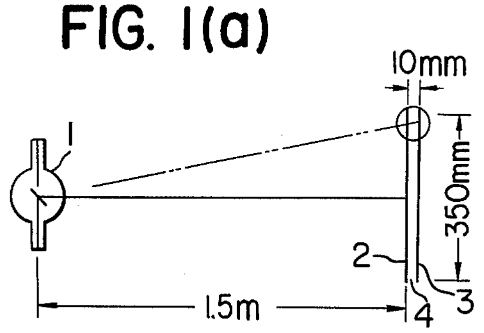
FIG. 1(*a*) is a schematic representation of a conventional electroradiography apparatus.
Figure 1B:
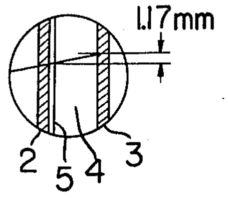
Figure 2:
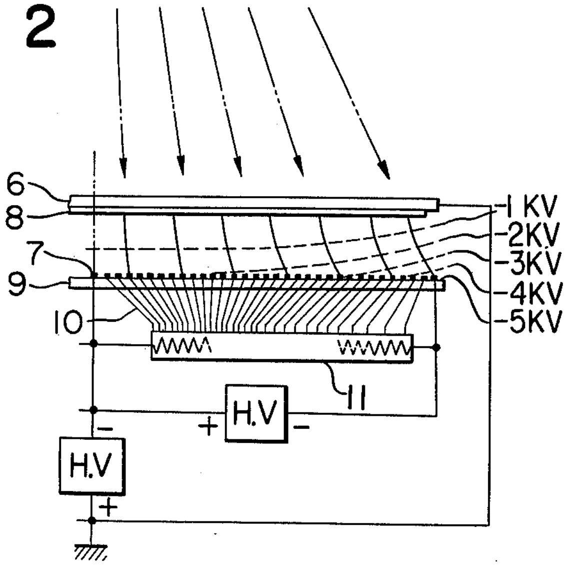
FIGS. 2 to 5 are schematic cross-sections of the electrode portion and showing various forms of the electrode.
Figure 3:
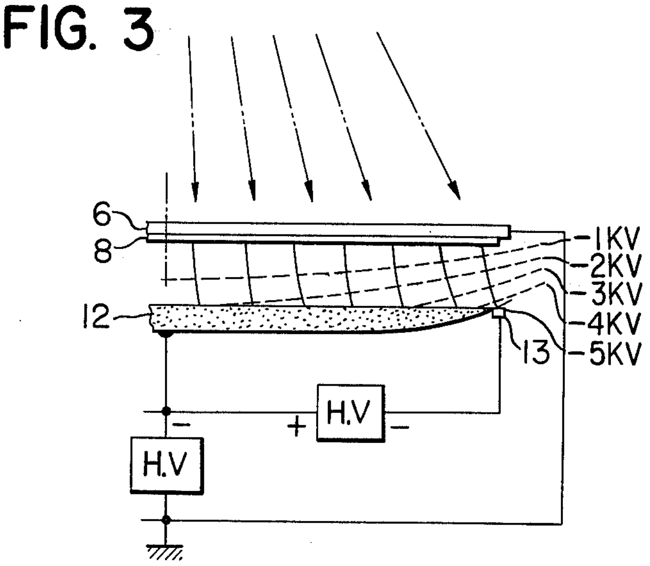

The principle and embodiments of the present invention will hereinafter be described with reference to the drawings. FIGS. 2 and 3 illustrate embodiments in which a voltage applied to the cathode side of electrodes defining a gap portion therebetween is varied in a planar manner, and these figures are schematic sectional views of the electrode portion. Referring first to FIG. 2, numeral 6 designates a planar anode electrode, and numeral 7 designates a cathode electrode which is in the shape of concentric circular streaks formed about a point at the shortest distance from a source of radiation such as X-rays emitted from a single spot. An insulative sheet member 8 is disposed on the anode electrode 6 so that an electrostatic latent image may be formed on the sheet member 8. The cathode electrode 7 is supported by an insulating member 9, and electrically connected to each terminal of a resistor by a lead wire 10. HV denotes high voltage source means and dots-and-dash lines indicate radiant rays emitted from a single spot.

Referring now to FIGS. 3, it shows an embodiment in which the cathode electrode 7 of FIG. 2 is substituted for by a resistor 12 having a thicker center region and a thinner marginal region and formed of metal film, dispersed phase of fine particles of carbon, metal or the like, ceramics or other semiconductor material, or a resistor material such as organic or inorganic salt or the like, so that the center region is of low resistance while the marginal region is of high resistance. Numeral 13 designates an annular electrode disposed around the periphery of the resistor 12.

In the two embodiments described above, a voltage of −2KV may be applied to the center region of the cathode electrode 7 or 12, a voltage of −5KV must be applied to the end portion of the cathode electrode 7 or 12, a suitable voltage from −2KV to −5KV may be applied to the intermediate region, and the anode electrode 6 is grounded. When voltages are applied in the manner described above, electric lines of force will act in the gap portion between the two electrodes in the manner as indicated by solid lines, and ions and electrons created by radiation will be attracted along the electric lines of force toward the respective anode and cathode electrodes. Dotted lines between the two electrodes indicate equipotential surfaces. It is of course possible that the potential varying electrode used on the cathode side is employed only on the anode side. In such a case, voltage application may be converse to the case of FIG. 2 or 3 and more specifically, if the potential across the cathode is zero, the voltage applied to the center region may be of high value while the voltage applied to the end portion may be of low value. In the electrode arrangement shown in FIG. 2 or 3, the potential variation between the electrodes tends to be slower toward the center region and sharper toward the end portion. Where one of the electrodes, i.e. the electrode of concentric circular configuration or the electrode of resistor having a low resistance in the center region thereof, as illustrated herein, is used to control the field between the two electrodes, the construction will become simple but it will be difficult to completely align all the electric lines of force with the direction of application of the radiation. The reason is that the electric lines of force act vertically with respect to that one of the electrodes which is provided with no potential distribution.

Figure 4:
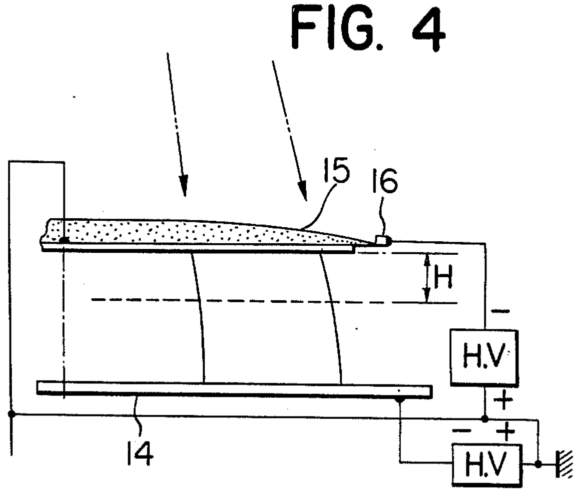

A solution to this problem will now be described by reference to FIG. 4, which is also a schematic sectional view of the electrode portion. The method of solution shown in FIG. 4 comprises causing the radiation to be applied in the direction from that electrode which is provided with a potential distribution, and making the thickness of the gap portion between the two electrodes greater than the thickness H which is necessary for the absorption of the radiation. The electrodes used in such method should be formed of a material having a good transmittivity to the radiation. Thus, in the region where the radiation is absorbed (i.e. the region within the thickness H), the direction of application of the radiation and the direction of the field become very close to each other. In FIG. 4, numeral 14 designates a cathode electrode, numeral 15 designates an anode electrode which may be identical with the anode electrode shown in FIG. 2 or 3, and numeral 16 designates an annular electrode disposed around the periphery of the anode electrode 15.

With such electrode arrangement in which only one of the anode and cathode is provided with a potential distribution, is is particularly impossible to completely correct the resolving power in the marginal portion of the image, yet the resolving power of the image in general may be greatly improved over that according to the prior art. Further, the electrode arrangement without connecting portion and provided with a potential distribution, such as the electrode specifically shown in FIG. 2 or 3, may sufficiently withstand the high pressure gases which will be retained in the gap portion.

Figure 5:
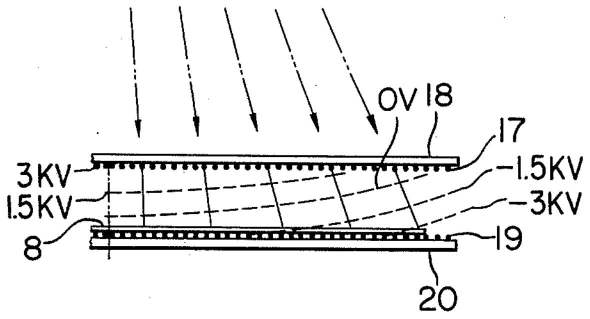

Another embodiment shown in FIG. 5 is more effective in the correction of the resolving power than those embodiments already described. FIG. 5 is a schematic sectional view of the electrode portion. In this embodiment, potential distribution is imparted to an electrode of concentric circular streaks formed about that point on the electrode which is nearest the source of radiation located at a single spot, as already described in connection with FIG. 2, and such electrode is used on both the anode and the cathode side. In FIG. 5, numeral 17 designates the anode electrode arranged in the shape of concentric circular streaks on an insulating member 18. Numeral 19 designates the cathode electrode similar in configuration to the anode electrode 17 and disposed on an insulating member 20. An insulative sheet member 8 for the formation of electrostatic latent image thereon is disposed on the cathode electrode. A suitable voltage may be applied to the electrode of circular streaks in the direction corresponding to the direction of incidence of the radiation. As a result, electric lines of force will act between the two electrodes in the manner as indicated by solid lines, and the ions and electrons produced from high pressure gases upon irradiation will be attracted along the electric lines of force toward each of the anode and cathode electrodes 17 and 19. As a result, an electrostatic latent image will be formed on the insulative sheet member 8. In the figure, dotted lines indicate the equipotential surfaces between the two electrodes, which equipotential surfaces are spherical surfaces concentric about the source of radiation.

Thus, by imparting potential distribution to the two anode and cathode electrodes as in the embodiment of FIG. 5, it is possible to completely align the field acting between the two electrodes with the direction of application of the radiation. Further, the field applied to the gap portion may be of substantially uniform intensity throughout the gap portion. Furthermore, where the electrode on the insulative sheet member on which the electrostatic latent image is formed is in the form of finely spaced streaks, the resultant electrostatic latent image, which is formed corresponding to the configuration of the streaks, would hardly produce an edge effect even if it was visualized by a developer carrying fine toner particles. In other words, it is feasible to obtain a good image which is free of the phenomenon that some inside portions of the black image become white. Such a merit could be attained even in the embodiment of FIG. 2 wherein the electrode of circular streaks is used only on one electrode side, if an insulative sheet member were disposed on that particular electrode to form an image thereon.

Figure 6A:
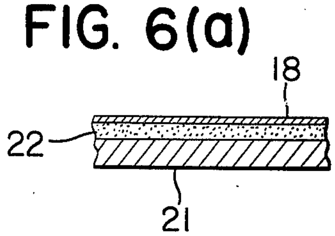
FIGS. 6(*a*) and (*b*) are fragmentary enlarged, sectional views of the electrode portion and illustrating the preferred manners in which a recording medium is assembled to the electrode.
Figure 6B:
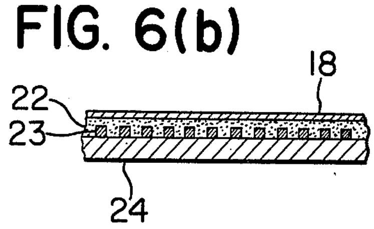

The insulative sheet member 8, 21 used in the image formation method according to the present invention will now be discussed more particularly. It is imperative that no layer of electrically conductive material must be present on that side of the insulative sheet member which is adjacent to the electrode and that such side of the sheet member be of sufficiently high resistance, say, $10^8\Omega$cm or above. In order to provide good contact between the sheet member and the associated electrode as required, a resistive liquid of the order of $10^7$ to $10^{12}\Omega$cm may be interposed therebetween. More specifically, as is shown in FIG. 6(*a*), the insulative sheet member 8 may be disposed over an electrode 21 provided with an electric gradient in the manner as described in connection with the embodiment of FIG. 3, with a resistor 22 such as resistive liquid or solid interposed therebetween. The resistor 22 may be predisposed on the sheet member 21 or on the electrode. FIG. 6(*b*) shows another arrangement in which an electrode 23 similar to that of FIG. 5 is wrapped in resistor 22 and a sheet member 8 is disposed thereon. In FIG. 6(*b*), numeral 24 designates an insulating member supporting the electrode 23 thereon. With the resistor being thus interposed between the electrode and the sheet member 8, the insulative sheet member 8 can be stably held by the resistor even when it is removed from the electrode 8. More particularly, the formed electrostatic latent image is prevented from being lost or disturbed by discharge and may be of good quality. Such effect is of course applicable to a curved electrode in an embodiment as shown in FIG. 7.

Figure 8:
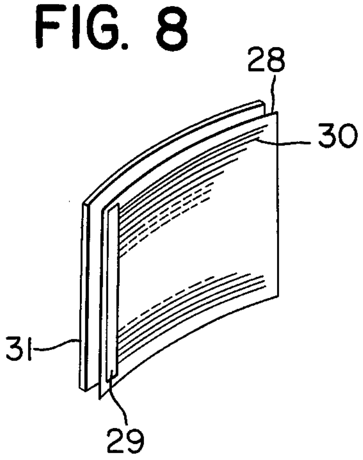
FIG. 8 is a perspective view showing an electrode formed on an insulative sheet member.
Figure 7:
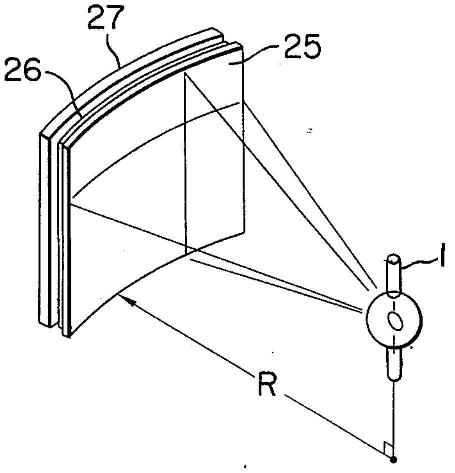
FIG. 7 is a perspective view illustrating the relationship between the radiation source and the electrode.

The embodiment of FIG. 7 differs from the above-described embodiments in that curved electrodes are disposed in opposing relationship to define a curved gap portion therebetween. This figure is a perspective view showing the relationship between a source of radiation and the electrodes. Designated by 1 is the source of radiation which emits radiant rays such as X-rays or the like from a single spot. An electrode 25 forms a cylindrical surface on a radius R from the source of radiation 1. An insulative sheet member 26 is disposed on the electrode 25, and an electrode 27 is located in a predetermined space-apart relationship with the electrode 25. When an electrostatic latent image is formed on the sheet member 26 by the electrodes 25 and 27 of FIG. 7 in the manner described above, the only problem left would be the reduction of resolving power in the vertical direction of the gap portion defined by the electrodes 25 and 27. To solve this problem, a voltage which is substantially equipotential in the horizontal direction but variable in the vertical direction may be applied to the electrodes. This method is easier to carry out than the application of a concentrically variable voltage to the electrodes as carried out in the previous embodiments. This will more particularly be described with reference to FIG. 8 which is a perspective view showing an embodiment wherein an electrode is formed on an insulative sheet member. As shown there, streaks of electrode 30 each having at least one end connected to a resistor 29 are formed on a sheet member 28. The resistor 29 has its thickness and formation suitably determined such that its resistance progressively decreases from the marginal region toward the center. The electrode 30 so formed provides the anode while another electrode 31 provides the cathode, and ionizable gases may be introduced into the gap portion between the sheet member 28 and to cathode electrode 31 so that an electrostatic latent image by be formed on the sheet member 28 in accordance with the above-described electroradiography. After the electrostatic latent image so formed on the sheet member 28 has been developed, and if it is desired to see through the developed image as an erect image but the electrode should stand as a barrier, then the electrode may be removed from the sheet member 28. In the embodiment of FIG. 8 the electrode is formed on the sheet member 28, but it will be apparent that the electrode as shown in FIG. 8 can replace the electrode shown in FIG. 7. It is further possible to provide the electrode 30 not only on the anode side but also on the cathode side and to form an image by using the two poles as in the embodiment of FIG. 5. However, in case where the electrode was made to be a spherical surface whose radius is the distance from the source of radiation, reduction in the resolving power could be prevented even if the electrode surface is at uniform potential, but the spherical surface would offer difficulties in the formation, conveyance and handling of the insulative sheet member.

Figure 9A:
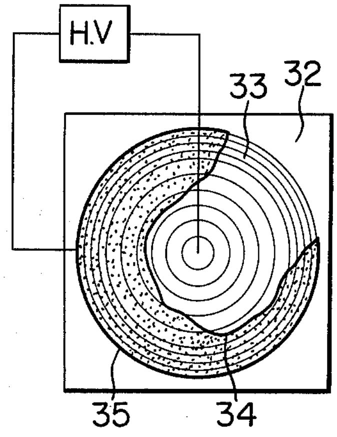
FIGS. 9 to 11 show various embodiments of the electrode portion to illustrate their formation and construction, FIGS. 9(*a*) and (*b*) being a partly broken-away front view and a transverse section, respectively, of the electrode according to an embodiment, FIGS. 10(*a*) and (*b*) being a front view and a transverse section, respectively, of the electrode according to another embodiment, and FIG. 11 being a front view of the electrode according to still another embodiment.
Figure 9B:
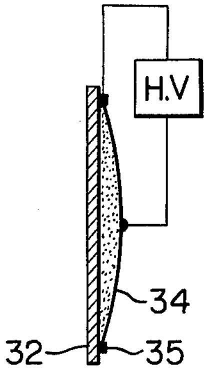
Figure 10A:
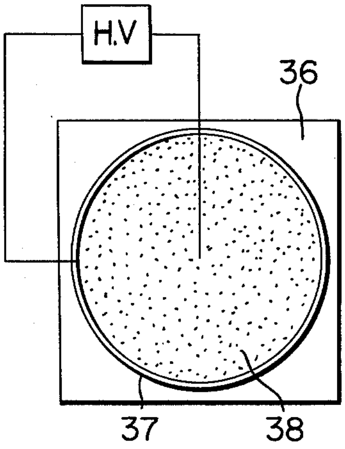
Figure 10B:
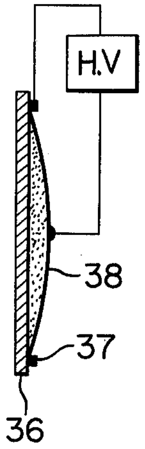
Figure 11:
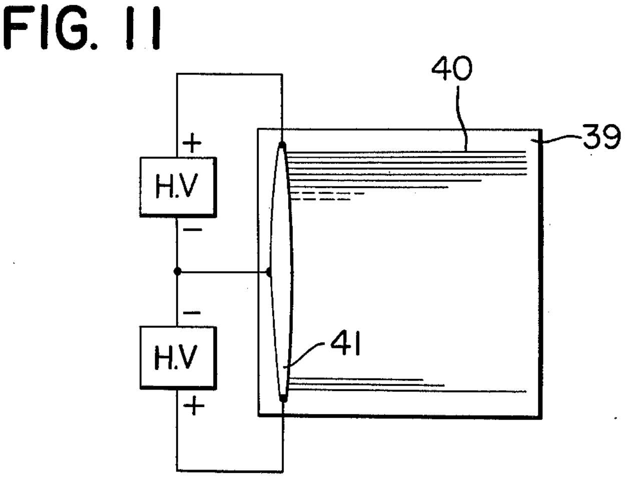

FIGS. 9 to 11 illustrate some examples of the method of forming the electrode for providing a potential distribution as described above.

FIG. 9(*a*) is a partly broken-away front view of the electrode, and FIG. 9(*b*) is a transverse cross section of the same electrode. The electrode shown in FIG. 9 is similar to that described in connection with FIG. 2 and it may be formed by evaporating aluminum to a thickness of 1 micron onto a polyethylene terephthalate film 32 having a thickness of 100 microns, and then etching the film to form an electrode 33 of concentric circular streaks at a density of ten lines per millimeter. Thereafter, a thin layer of aluminum 34 acting as resistor is deposited by evaporation to a thickness of 1000A on the film, and an annular electrode 35 formed of good conductor such as copper, aluminum or the like is provided around the periphery of the thin layer 34. By applying a voltage between the annular electrode 35 and the center of the electrode 33 of concentric circular configuration, there may be provided a concentrically varying potential distribution over the film 32. The thin layer 34 may suitably be formed to present a thickness progressively increasing toward the center portion and progressively decreasing toward the marginal portion, whereby a desired potential distribution may be provided over the surface of the film 32.

FIGS. 10(*a*) and (*b*) are a front view and a transverse section, respectively, of the electrode described in connection with FIG. 3. This electrode may be formed by providing an annular electrode 37 around the periphery of a polyethylene terephthalate film 36 having a thickness of 100 microns, and forming inside the annular electrode 36 an evaporated thin layer 38 of metal such as nickel, aluminum, magnesium or the like acting as resistor. By application of a voltage between the annular electrode 37 and the center of the thin layer 38, there may be provided a concentrically varying potential distribution over the film 36. The thin layer 38 is used as resistor and so, the layer 38 is formed so as to present a thickness progressively increasing toward the center portion and progressively decreasing toward the marginal portion, thus providing a desired potential distribution in the same manner as does the electrode of FIG. 9.

Any of the electrodes shown in FIGS. 9 and 10 comprises an insulative film as the base, so that electrostatic latent image may be formed on such film as well. Further, these electrodes provide a higher potential particularly in the marginal portion and such higher potential can correct the marginal latent image which tends to weaken.

FIG. 11 shows, in front view, the electrode described in connection with FIG. 8. The electrode of FIG. 11 may be provided by evaporating aluminum to a thickness of 1 micron onto a polyethylene terephthalate film 39 having a thickness of 100 microns, and then etching the film to form an electrode of straight streaks 40 at a density of 10 lines per millimeter. Thereafter, a resistor 41 is printed on the film 39 at one side edge thereof for electrical connection to the electrode 40. The resistor 41 varied in its thickness, configuration, etc. so that its resistance decreases from the marginal portion toward the center portion in order that potential variation is smaller in the center portion of the entire electrode and greater toward the marginal portion. The resistance effect of the resistor 41 results in the provision of a desired potential distribution over the film 39. It will be noted that the formation of the electrode 40 may be simply accomplished not only by etching but also by printing the film with ink or paint which will act as conductor or semiconductor. By the use of such thin streaks of electrode as shown in FIG. 11, it will become possible to provide a predetetermined potential variation accurately in one direction. In contrast, an electrode comprising a resistor or a series of resistors having different resistance values would tend to cause irregularities in electrical resistance and could hardly provide smooth potential variation. The present embodiment also overcomes such a problem. Further, by disposing an insulative sheet member on the electrode 40 or by causing an electrostatic latent image to be formed on the film 39 due to line resolution, it will be possible to reduce the edge effect and visualize the image on the black surface.

In the embodiments shown in FIGS. 9 to 11, the electrically conductive material forming the electrode is not restricted to metal but use may be made of electrically conductive resin such as fourth-grade ammonium salt or the like, or electrically conductive paint which is a dispersed phase of carbon, fine particles of metal or the like. If the electrode for providing potential distribution is located on that side from which the radiation is thrown, the shadow of the electrode must not affect the formation of electrostatic latent image. Taking aluminum as an example, a thickness less than the order of 1 to 2 microns would offer no problem as the electrode in ordinary electroradiography apparatus.

According to the present invention, as has been described hitherto, potential distribution is provided between electrodes so as to cause electric lines of force to act in the direction of application of the radiation, whereby the resolving power in the marginal portion of an electrostatic latent image being formed is not reduced even if the inter-electrode gap is relatively thick. An increased thickness for the interelectrode gap in turn means that ionizable gases, if used at a high pressure, can be correspondingly reduced in their pressure. Thus, the present invention can increase the thickness for the inter-electrode gap without reducing the resolving power in the marginal portion of the formed image, and accordingly can decrease the gap pressure, thereby overcoming the difficulties which would otherwise be encountered in the handling of high pressure gases.

I claim:

1. An image forming process which comprises;

filling a space formed between two electrodes with a gas, wherein one of the two electrodes comprises a resistance member having one face which is planar and an opposite face which is curved to provide a gradually changed thickness from a central portion to a marginal portion of said one electrode;

simultaneously applying radiation to said gas from a point source through an object to be imaged to form an image of the object on a plate disposed within said space, and applying a first potential difference to said electrodes and a second potential difference between the central portion and the marginal portion of the resistance member, thereby forming between said one electrode and the other electrode an electric field whose electric field lines extend substantially in the direction of the radiation passing through said space.

2. An image forming process according to claim 1, wherein the resistance member of said one electrode has a larger thickness at the central portion thereof and a smaller thickness at the marginal portion, and the flat face thereof is provided with an insulating member exposed to said space.

3. An image forming process according to claim 1, wherein the application of radiation is directed toward the other of said two electrodes, said other electrode comprising a flat conductive member having said plate for forming an image disposed thereon, and wherein said flat face of the resistance member is exposed to said space.

4. An image forming process according to claim 1, wherein the application of radiation is directed toward said one electrode, the flat face of which is exposed to said space.

5. An image forming process which comprises;

filling a space formed between two electrodes with a gas, wherein one of the two electrodes comprises a plate-shaped resistance member having a gradually decreasing thickness from a central portion to a marginal portion thereof;

disposing a plate for receiving an image within said space between said electrodes;

simultaneously applying radiation to said gas from a point source through an object to be imaged to form an image of the object of said plate disposed within said space, and applying a first potential difference to said electrodes and a second potential difference between the central portion and the marginal portion of the resistance member, for forming between said one electrode and the other electrode an electric field whose electric field lines extend substantially in the direction of the radiation passing through said space.

* * * * *

UNITED STATES PATENT OFFICE
CERTIFICATE OF CORRECTION

Patent No. 4,025,789 Dated May 24, 1977

Inventor(s) YUJIRO ANDO

It is certified that error appears in the above-identified patent and that said Letters Patent are hereby corrected as shown below:

Column 1, line 33, change "pressure" to read --pressures--.

Column 3, line 30, change "FIGS." to read --FIG.--.

Column 3, line 43, delete "must" and insert --may--.

Column 9, line 1, delete "of" (second occurrence) and insert --on--.

Signed and Sealed this

*thirtieth* Day of *August 1977*

[SEAL]

*Attest:*

RUTH C. MASON
*Attesting Officer*

C. MARSHALL DANN
*Commissioner of Patents and Trademarks*